(12) United States Patent
Tan et al.

(10) Patent No.: US 10,558,088 B2
(45) Date of Patent: Feb. 11, 2020

(54) DISPLAY SUBSTRATE MOTHERBOARD AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Cong Tan, Beijing (CN); Jian Ma, Beijing (CN); Wenming Ren, Beijing (CN); Chengyong Zhan, Beijing (CN)

(73) Assignees: BOE TECHNOLOGY GROUP CO., LTD., Beijing (CN); HEFEI XINSHENG OPTOELECTORNICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/970,847

(22) Filed: May 3, 2018

(65) Prior Publication Data
US 2019/0018290 A1    Jan. 17, 2019

(30) Foreign Application Priority Data
Jul. 13, 2017  (CN) .......................... 2017 1 0571658

(51) Int. Cl.
*G02F 1/1337*   (2006.01)
*G02F 1/1339*   (2006.01)
*G02F 1/1335*   (2006.01)
*G02F 1/1333*   (2006.01)

(52) U.S. Cl.
CPC ...... *G02F 1/133784* (2013.01); *G02F 1/1339* (2013.01); *G02F 1/133351* (2013.01); *G02F 1/133512* (2013.01); *G02F 1/133514* (2013.01); *G02F 2201/50* (2013.01)

(58) Field of Classification Search
CPC ................................................. G02F 1/133351
See application file for complete search history.

(56) References Cited

U.S. PATENT DOCUMENTS

2005/0253994 A1* 11/2005 Kamijima ......... G02F 1/133351
                                                        349/155
2009/0185128 A1*  7/2009 Huang .............. G02F 1/133784
                                                        349/155

* cited by examiner

*Primary Examiner* — Alexander P Gross
(74) *Attorney, Agent, or Firm* — Kinney & Lange, P.A.

(57) ABSTRACT

A display substrate motherboard and a display device are provided. The display substrate motherboard includes a plurality of display regions spaced from each other; an assistant support structure between two adjacent display regions of the plurality of display regions, and a height of the assistant support structure increases gradually from an edge of the assistant support structure towards a central location of the assistant support structure along a predetermined direction.

10 Claims, 2 Drawing Sheets

DISPLAY SUBSTRATE MOTHERBOARD AND DISPLAY DEVICE

CROSS-REFERENCE TO RELATED APPLICATION

This application claims the benefit of Chinese Patent Application No. 201710571658.1 filed on Jul. 13, 2017 in the State Intellectual Property Office of China, the whole disclosure of which is incorporated herein by reference.

BACKGROUND

Technical Field

The embodiments of the present disclosure relate to the field of display technologies, and especially to a display substrate motherboard and a display device.

Description of the Related Art

Since a motherboard of a display panel at present has a relatively large area, in addition to spacers provided in display regions of one of the motherboards, an assistant pattern having a certain thickness (namely Dummy Pattern) is further provided in Dummy regions outside the display regions of one of the motherboards in the related art, such that a uniformity of the force exerted outside the display regions on the display panel motherboard is increased after alignment and assembly. However, since the assistant pattern has a certain thickness (typically 1.5 µm to 2.0 µm), when an alignment layer coated on an outermost layer of the display regions of the motherboard is rubbed with a friction roller, a damage to a rubbing cloth on a surface of the friction roller may thus be incurred readily.

SUMMARY

According to an aspect of the present disclosure, there is provided a display substrate motherboard comprising: a plurality of display regions spaced from each other; an assistant support structure between two adjacent display regions of the plurality of display regions, wherein a height of the assistant support structure increases gradually from an edge of the assistant support structure towards a central location of the assistant support structure along a predetermined direction.

In an embodiment of the present disclosure, the predetermined direction is parallel to a friction direction of a friction roller.

In an embodiment of the present disclosure, the display substrate motherboard further comprises a display pattern layer in the display regions, wherein the central location of the assistant support structure has a height equal to a maximum thickness of the display pattern layer.

In an embodiment of the present disclosure, the display substrate motherboard further comprises a substrate motherboard, the assistant support structure and the display pattern layer being arranged on the substrate motherboard; wherein the display pattern layer comprises a black matrix, color filter blocks separated by the black matrix, a protection layer covering the black matrix and the color filter blocks and a spacer on the protection layer; and wherein the assistant support structure comprises at least one of a black matrix retention pattern arranged in a same layer as the black matrix, a color filter block retention pattern arranged in a same layer as the color filter blocks, a protection layer retention pattern arranged in a same layer as the protection layer and an assistant spacer arranged in a same layer as the spacer.

In an embodiment of the present disclosure, the assistant support structure comprises the black matrix retention pattern, the color filter block retention pattern, the protection layer retention pattern and a plurality of assistant spacers arranged on the protection layer retention pattern, all of which are arranged in sequence away from the substrate motherboard.

In an embodiment of the present disclosure, a height of at least one of the black matrix retention pattern and the color filter block retention pattern increases gradually from edges towards a central location in a direction parallel to a friction direction of a roller; and/or heights of the assistant spacers increase gradually from edges thereof towards a central location in a direction parallel to the friction direction.

In an embodiment of the present disclosure, the height increases from the edges towards the central location in a step form or in a slope form.

In an embodiment of the present disclosure, the display regions are arranged in an array and spaced apart from one another; and each of the display regions has two opposed first sides parallel to a row direction of the array, and two opposed second sides parallel to a column direction of the array, wherein the assistant support structure between two adjacent rows of the display regions is parallel to the first sides, and/or wherein the assistant support structure between two adjacent columns of the display regions is parallel to the second sides.

In an embodiment of the present disclosure, there are two assistant support structures between the two adjacent rows of the display regions; and/or there are two assistant support structures between the two adjacent columns of the display regions.

In an embodiment of the present disclosure, each of the display regions adjacent to a corresponding one of the edges of the display substrate motherboard has a third side adjacent to the corresponding one of the edges of the display substrate motherboard and one assistant support structure parallel to the third side is arranged between the third side and the edge of the display substrate motherboard.

In an embodiment of the present disclosure, the display substrate motherboard further comprises ring-shaped sealant regions each surrounding a corresponding one of the display regions; and the assistant support structure is arranged in a dummy region between two adjacent ring-shaped sealant regions.

According to another aspect of the present disclosure, there is provided a display device comprising a display substrate, wherein the display substrate is any one of a plurality of display substrates formed by slicing the above mentioned display substrate motherboard.

BRIEF DESCRIPTION OF THE DRAWINGS

In order to describe the technical solution in the embodiments of the present disclosure or the related art more clearly, the drawings used in the description of the embodiments or related technologies will be briefly described below. Obviously, the drawings in the following description are only taken as examples. For some embodiments disclosed, those skilled in the art can also obtain other drawings based on these drawings without any inventive effort.

DETAILED DESCRIPTION

Figure 1:
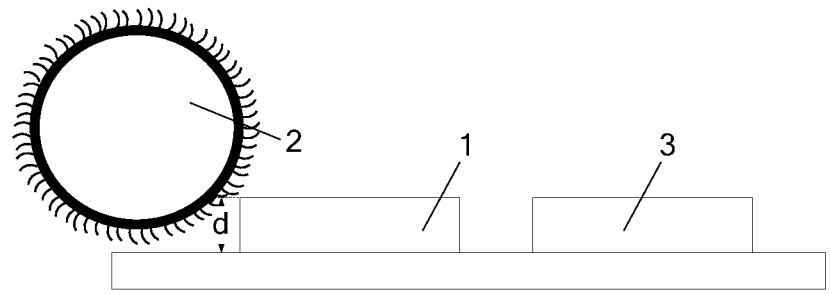
FIG. 1 is a schematic diagram of an effect of a friction roller on a surface of a motherboard in a related art.

The technical solutions in the embodiments of the present disclosure will be clearly described in the following with reference to the accompanying drawings in the embodiments of the present disclosure. Apparently, the described embodiments are merely some but not all of the embodiments of the present disclosure. All other embodiments obtained by those skilled in the art based on the embodiments of the present disclosure without inventive efforts shall fall within the protection scope of the present disclosure.

For example, terms "first", "second" and the like, as used in the specification and claims of this patent application, do not denote any order, quantity, or importance, but are used to distinguish elements from another. Terms "include" or "comprise" and the like, mean that an element or item preceding the terms encompasses elements or items listed after the terms and their equivalence, and not for the exclusion of other elements or items. Terms "up/down" and "down/below" or the like indicating the position or positional relationship are based on the orientation or positional relationships shown in the drawings, and are merely used for convenience of describing the simplified description of the technical solutions of the present disclosure, it doesn't mean that the taught or suggested device or element must have a particular orientation, and must be constructed and operated in a particular orientation, and therefore these terms should not be construed as limiting the present disclosure.

As shown in FIG. 1, an assistant pattern 1 having a certain thickness is provided in a dummy region outside display regions of the substrate motherboard, and it is required that the assistant pattern 1 has a certain thickness (typically 1.5 μm to 2.0 μm) so as to increase a supporting force between the two motherboards both of which are aligned and assembled, with a level difference between edges of the assistant pattern and a planar area of the motherboard substrate (the level difference being indicated as d in the drawing) is relative larger. When an alignment layer coated on an outermost layer of the display regions of the motherboard is rubbed with a friction roller 2, a damage to a rubbing cloth on a surface of the friction roller may be incurred readily when the friction roller is rolled onto the assistant pattern, thereby affecting the rubbing effect of the alignment layer on the surface of a display pattern 3 in the display regions, resulting in a Rubbing Mura (i.e., a rubbing water ripple phenomenon) appearing in the display regions, that is, a partially or completely uneven friction may occur in the display regions, adversely affecting both product quality and yield.

Figure 2:
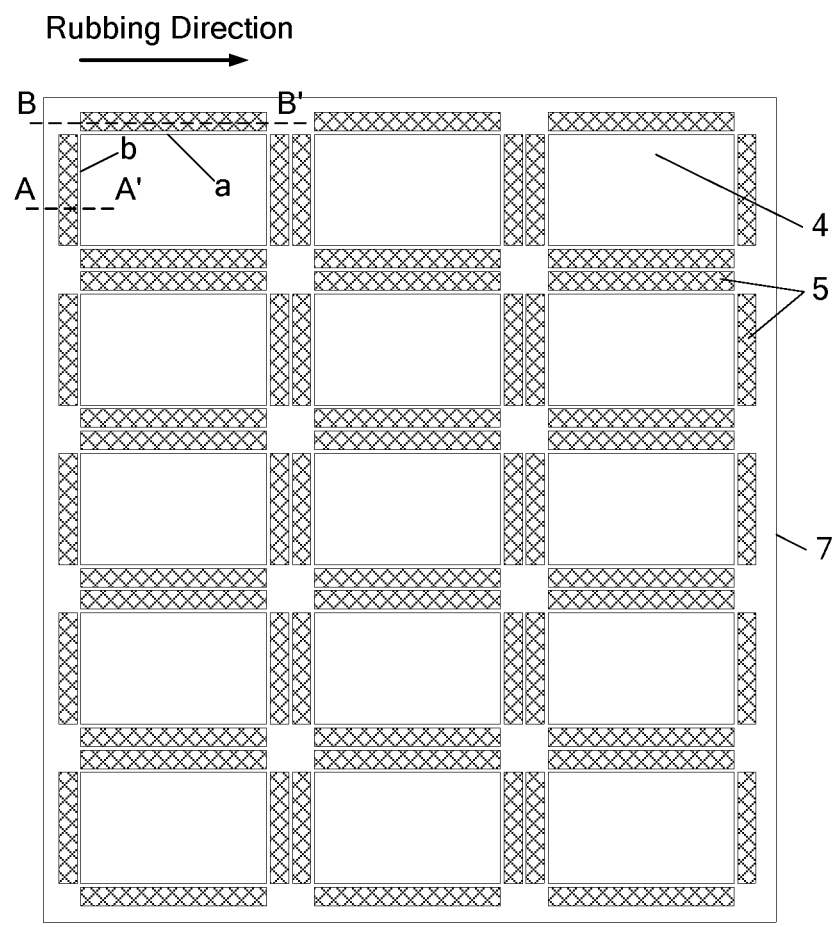
FIG. 2 is a schematic top view of a display substrate motherboard according to an embodiment of the present disclosure.
Figure 3:
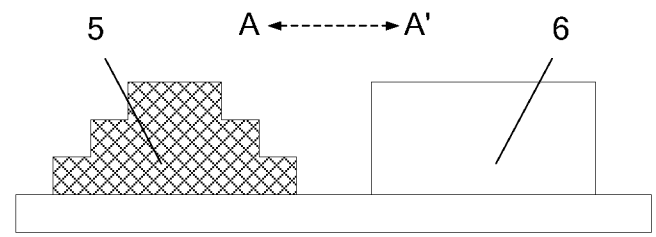
FIG. 3 is a schematic view of the structure of a section taken along line AA' in FIG. 2.
Figure 4:
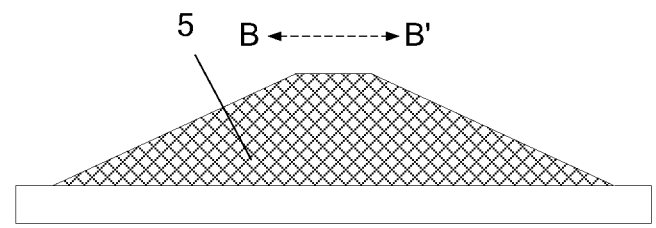
FIG. 4 is a schematic view of the structure of a section taken along line BB' in FIG. 2.

As shown in FIG. 2 to FIG. 4, in an embodiment of the present disclosure, a display substrate motherboard is provided, including a plurality of display regions 4 spaced from one another; and the display substrate motherboard further includes assistant support structures 5 between two adjacent display regions 4. A height of the assistant support structure 5 increases gradually from edges of the assistant support structure towards a central location of the assistant support structure in a predetermined direction, specifically in a rubbing direction parallel to the friction roller.

It should be noted that there is a tendency in a change of a height of the assistant support structure 5, lying in that the height of the assistant support structure 5 increases gradually in the direction parallel to the rubbing direction of the friction roller from the edges towards the central location thereof, which means that, refer to FIG. 3 and/or FIG. 4, the height of the assistant support structure 5 perpendicular to a plane of the substrate is illustrated to increase from the edges towards the central location thereof in a direction parallel to the rubbing direction.

The tendency in the change of the height of the assistant support structure 5 in the direction parallel to the rubbing direction of the friction roller, i.e., the way in which the height of the assistant support structure 5 increases gradually from the edges towards the central location thereof, includes but is not limited to an example of the assistant support structure 5 in a form of a step shape as shown in FIG. 3, or a slope shape as shown in FIG. 4. In other words, it is only necessary to satisfy a condition in which the height at a central portion of a cross section of the assistant support structure 5 in the direction perpendicular to the plane of the substrate and parallel to the rubbing direction of the friction roller is a maximal height thereof, and the height of the assistant support structure 5 decreases from the central portion to both sides gradually.

Here, the above-described assistant support structure 5 having the above mentioned thickness varying from one region to another may be formed with a half tone or gray tone mask exposure technique. The halftone or gray-tone mask exposure technology may be those applied in related prior art, which are not described repeatedly in embodiments of the present disclosure.

Based on the above-mentioned display substrate motherboard provided in the embodiments of the present disclosure, by designing the assistant support structure disposed between various display regions such that the height thereof gradually changes from a small value to a large value (i.e., increases progressively) from the edges towards the central location thereof in the rubbing direction, the height of the assistant support structure gradually changing in the rubbing direction is used to reduce the level difference between the edges thereof and the planar area of the substrate, while the assembly thickness around the display regions may be maintained effectively. On one hand, the friction roller is rolled from the planar area of the motherboard to an area where the assistant support structure is located, a contact degree between the fluff on the surface of the rubbing cloth and the assistant support structure is increased gradually; On the other hand, when the friction roller is rolled away from the area where the assistant support structure is located, a separation degree between the fluff on the surface of the rubbing cloth and the assistant support structure is decreased gradually. The above-mentioned height design of the assistant support structure is used such as to provide a certain transition zone with a gradually height variation when the friction roller is rolled frictionally thereon, thereby reducing or avoiding the damage to the friction cloth in the friction process due to the fact that the level difference of at the edge of the assistant pattern in the related art is relatively large, increasing the quality and yield of a finished liquid crystal display product.

Based on the above, referring to FIG. 3, the display substrate motherboard further includes a display pattern layer 6 disposed in the display regions. In order to further improve an effect in supporting the periphery of the display regions by the above-mentioned assistant support structure 5, in the embodiments of the present disclosure, the height at the central location of the assistant support structure 5 is the same as a maximum thickness of the display pattern layer 6, that is, the same as the thickness of the display regions.

Further, the display motherboard may specifically be an array substrate motherboard or a color filter motherboard. Taking into account that the structure of the color filter substrate motherboard is simpler, when being used on the color filter substrate motherboard, the assistant support structure 5 may be formed with a material of a BM (Black Matrix), RGB (Red, Green, Blue) color resistors, PS (Post Spacer, i.e., column spacer) material on the color filter. The process is further simplified. Therefore, in the embodiment of the present disclosure, the display substrate motherboard is a color filter substrate motherboard.

Figure 5:
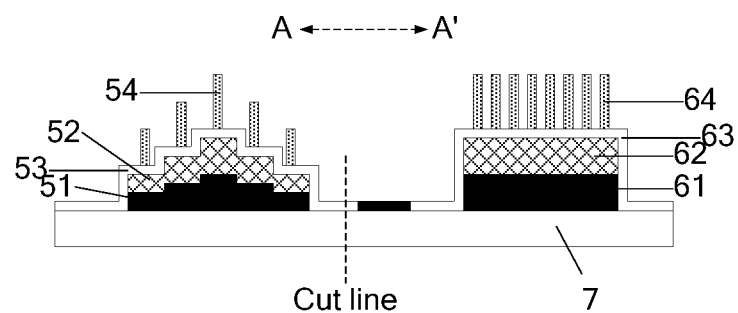
FIG. 5 is another schematic view of the structure of a section taken along line AA' in FIG. 2.

Specifically, as shown in FIG. 5, the display substrate motherboard further includes a substrate motherboard 7, the assistant support structure 5 and the display pattern layer 6 being disposed on the substrate motherboard 7. The display pattern layer 6 specifically includes a black matrix 61, color filter blocks 62 spaced apart by the black matrix 61, a protection layer 63 covering the black matrix 61 and the color filter blocks 62, and spacers 64 disposed on the protection layer 63. The assistant support structure 5 specifically includes at least one of a black matrix retention pattern 51 disposed in a same layer as the black matrix 61, a color filter block retention pattern 52 disposed in a same layer as the color filter blocks 62, a protection layer retention pattern 53 disposed in a same layer as the protection layer 63, and an assistant spacers 54 disposed in a same layer as the spacers 64.

It should be noted that the specific materials of the black matrix 61, the color filter blocks 62, the protection layer 63, and the spacers 64 in the display pattern layer 6 and the arrangement manner of the color filter blocks 62 may all follow technologies in the related art, which will not be repeated in the embodiments of the present disclosure. Exemplarily, the above-mentioned color filter blocks 62 may specifically be color filter blocks or color light-emitting blocks.

The above expression "disposed in the same layer as" is directed to at least two patterns and refers to a structure in which the at least two patterns are arranged on one same layer film. Specifically, the at least two patterns are formed on a layer of film made of a same material through a patterning process. Taking the above-mentioned black matrix 61 and black matrix retention pattern 51 as an example, that is, coating or depositing a material of a black matrix on the substrate motherboard 7, a desired pattern of the black matrix 61 is formed in the display regions by a corresponding patterning process, while the black matrix material is retained in a corresponding area between two adjacent display regions to form the black matrix retention pattern 51 described above.

The above-described assistant support structure 5 includes at least one of the black matrix retention pattern 51, the color filter block retention pattern 52, the protection layer retention pattern 53, and the assistant spacers 54.

That is, when the assistant support structure 5 includes any one of the above-mentioned four kinds of pattern layers, the height (thickness) of the pattern is increased from the edges toward the central location thereof in the direction parallel to the rubbing direction of the friction roller.

When the assistant support structure 5 includes at least two pattern layers of the above-mentioned four-layer pattern layers, the height (thickness) of at least one of the two patterns is increased from the edges toward the central location thereof in the direction parallel to the rubbing direction of the friction roller, such that a tendency in variation of an overall height of the assistant support structure 5 presents an effect of increasing from the edges towards the center thereof.

Further, in order to increase a utilization rate of materials in each layer of the display pattern layer 6, in the embodiment of the present disclosure, the above-mentioned assistant support structure 5 specifically includes the black matrix retention pattern 51 and the color filter retention pattern 52, a protection layer retention pattern 53 and a plurality of assistant spacers 54 provided on the protection layer retention pattern 53, which are arranged sequentially away from the substrate motherboard 7.

Each of the assistant spacers 54 (PS) has a relatively small size, and is usually made of an organic material or other elastic material, which may not readily result in a damage to the rubbing cloth.

Figure 6:
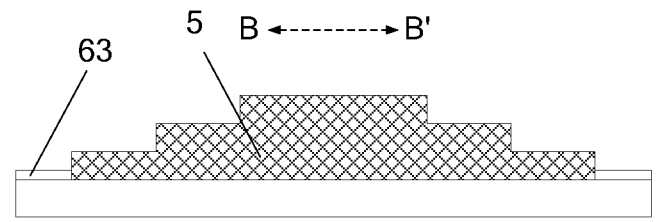
FIG. 6 is another schematic view of the structure of a section taken along line BB' in FIG. 2.

Here, in order to simplify the process, the protection layer 63 in an actual mass production is generally an entire layer covering the display regions and the area outside the display regions, i.e. the protection layer 63 and the protection layer retention pattern 53 are formed into an integrated structure. Specifically, as shown in FIG. 6, the protection layer 63 also covers the rest of the substrate motherboard 7 except for the assistant support structure 5. In addition, since the protection layer 63 is only used to protect the color filter structure underneath, its thickness is usually relatively small. It is difficult to form itself into a stepped shape. Therefore, in the disclosed embodiment, the stepped shape of the assistant support structure 5 is formed by a combination of BM and RGB and PS.

Specifically referring to FIG. 5, the height of at least one of the black matrix retention pattern 51 and the color filter block retention pattern 52 increases from the edges thereof toward the center in the direction parallel to the rubbing direction; and/or, the height of each of the assistant spacers 54 increases from the edges thereof toward the center in the direction parallel to the rubbing direction.

Here, it is only illustrated in FIG. 5, a manner in which the heights of the black matrix retention pattern 51, the color filter block retention pattern 52, and the assistant spacers 54 are gradually increased from the edges toward the central location. Since the height of each layer of the pattern may be gradually changed in such a manner, there may be even more progression levels of an overall change in the height of the finished assistant support structure 5, such that any possible damage to the surface fluff of the rubbing cloth may be further reduced.

A specific fabrication method may utilize the Half Tone Mask technology to form BM, RGB and PS pattern layers with different thicknesses.

The case that the height of only one of the black matrix retention pattern 51 and the color filter retention pattern 52 is increased from the edges toward the central location in the direction parallel to the rubbing direction of the friction roller, or that the height of each of the assistant spacers 54 is increased from the edges toward the central location in the direction parallel to the rubbing direction of the friction roller, may be referred to FIG. 5, details of which are not described herein again.

On the basis of the above, the assistant support structure 5 is arranged in a row direction and/or a column direction to increase the utilization rate of the area outside the display regions in the display substrate motherboard and provide a uniform supporting force.

Specifically, referring to FIG. 2, the display regions 4 are arranged in an array and spaced from one another; the display region 4 has two opposite first sides (marked as 'a' in the Figure) parallel to the row direction and two opposite second sides (marked as 'b' in the Figure) parallel to the column direction. The assistant support structures 5 located between two adjacent rows of display regions 4 are disposed parallel to the first sides a, and/or the assistant support structures 5 located between two adjacent columns of display regions 4 are disposed parallel to the second sides b.

Also, considering that in the display substrate motherboard, the area between the two adjacent rows of and/or the two adjacent columns of the display regions 4 is relatively larger, a supporting effect and a cushioning effect to the friction roller may be limited if only one support structure 5 is provided. With reference to FIG. 2, the number of assistant support structures 5 located between two adjacent rows of display regions 4 is two, and/or the number of assistant support structures 5 located between two adjacent columns of display regions 4 is two. And since the area at the edges of the display substrate motherboard is relatively smaller, the number of the assistant support structures 5 located near the edge of the motherboard outside the first row and the last row of the display regions of the display substrate motherboard may be one; similarly, the number of the assistant support structures 5 located near the edges of the motherboard outside the first column and the last column of the display regions of the display substrate motherboard may also be one.

Based on the above, referring to FIG. 5, the above-mentioned display substrate motherboard further includes ring-shaped sealant regions each surrounding the display regions; and the assistant support structure 5 is arranged in a dummy region between two adjacent ring-shaped sealant regions.

When the above-mentioned display substrate motherboard is sliced, the cut line is located outside the ring-shaped sealant regions, that is, in a single finished display substrate having relatively small sizes, there are only the ring-shaped sealant regions and an area bound with an IC (Integrated Circuit) outside the display regions, without the above-mentioned dummy region and the assistant support structure(s) 5 located in the dummy region, so as to avoid a broadened width of each border/bezel of an individual display device.

Based on the above, the embodiments of the present disclosure further provides a display device comprising a display substrate, which is one of a plurality of display substrates cut out from the above mentioned display substrate motherboard. That is, each of the display substrates includes one of above display regions.

The above display device may be specifically a liquid crystal display device, and may be a liquid crystal display, a liquid crystal television, a digital photo frame, a mobile phone, a tablet computer, a navigator as well as a product or component having any display functions.

The above description is only the specific implementations of the present disclosure, and the protection scope of the present disclosure is not limited thereto. Modifications or replacements which may be easily thought of by those skilled in the art within the technical scope in the present disclosure should all be covered by the protection scope of the present disclosure. Therefore, the protection scope of the present disclosure should be defined by the protection scope of the claims.

What is claimed is:

1. A display substrate motherboard comprising:
   a plurality of display regions spaced from each other; and
   an assistant support structure between two adjacent display regions of the plurality of display regions,
   wherein a height of the assistant support structure increases gradually from an edge of the assistant support structure towards a central location of the assistant support structure along a predetermined direction,
   the display substrate motherboard further comprises a substrate motherboard, the assistant support structure and the display pattern layer being arranged on the substrate motherboard,
   wherein the display pattern layer comprises a black matrix, color filter blocks separated by the black matrix, a protection layer covering the black matrix and the color filter blocks and a spacer on the protection layer,
   wherein the assistant support structure comprises at least one of a black matrix retention pattern arranged in a same layer as the black matrix, a color filter block retention pattern arranged in a same layer as the color filter blocks, a protection layer retention pattern arranged in a same layer as the protection layer and an assistant spacer arranged in a same layer as the spacer, and
   wherein the assistant support structure comprises a stepped portion which has a height increasing gradually from an edge of the assistant support structure towards a central location of the assistant support structure along a predetermined direction, and an assistant spacer is provided on each step of the stepped portion.

2. The display substrate motherboard of claim 1, wherein the predetermined direction is parallel to a friction direction of a friction roller.

3. The display substrate motherboard of claim 1, further comprising a display pattern layer in the display regions,
   wherein the central location of the assistant support structure has a height equal to a maximum thickness of the display pattern layer.

4. The display substrate motherboard of claim 1, wherein the assistant support structure comprises the black matrix retention pattern, the color filter block retention pattern, the protection layer retention pattern and a plurality of assistant spacers arranged on the protection layer retention pattern, all of which are arranged in sequence away from the substrate motherboard.

5. The display substrate motherboard of claim 4, wherein:
   heights of the assistant spacers increase gradually from edges thereof towards central locations thereof in a direction parallel to the friction direction of the friction roller.

6. The display substrate motherboard of claim 1, further comprising: ring-shaped sealant regions each surrounding a corresponding one of the display regions, wherein the assistant support structure is arranged in a dummy region between two adjacent ring-shaped sealant regions.

7. A display device comprising a display substrate, wherein the display substrate is any one of a plurality of display substrates formed by slicing the display substrate motherboard of claim 1.

8. The display substrate motherboard of claim 1, wherein the display regions are arranged in an array and spaced apart from one another; and each of the display regions has two opposed first sides parallel to a row direction of the array, and two opposed second sides parallel to a column direction of the array,
- wherein the assistant support structure between two adjacent rows of the display regions is parallel to the first sides, and/or
- wherein the assistant support structure between two adjacent columns of the display regions is parallel to the second sides.

9. The display substrate motherboard of claim 8, wherein:
- there are two assistant support structures between the two adjacent rows of the display regions; and/or
- there are two assistant support structures between the two adjacent columns of the display regions.

10. The display substrate motherboard of claim 9, wherein each of the display regions adjacent to a corresponding one of the edges of the display substrate motherboard has a third side adjacent to the corresponding one of the edges of the display substrate motherboard, and one assistant support structure parallel to the third side is arranged between the third side and the corresponding one of the edges of the display substrate motherboard.

* * * * *